(No Model.)　　　　T. D. FAULKNER.　　　2 Sheets—Sheet 1.
SPRING MOTOR.
No. 273,047.　　　　　　Patented Feb. 27, 1883.
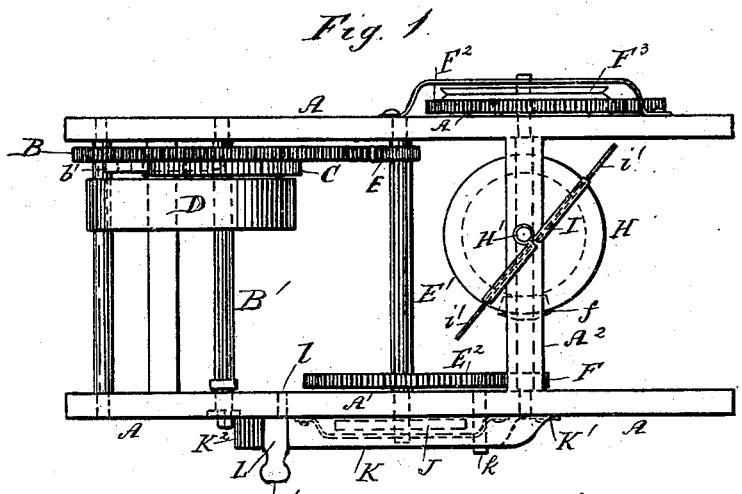
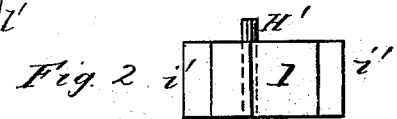
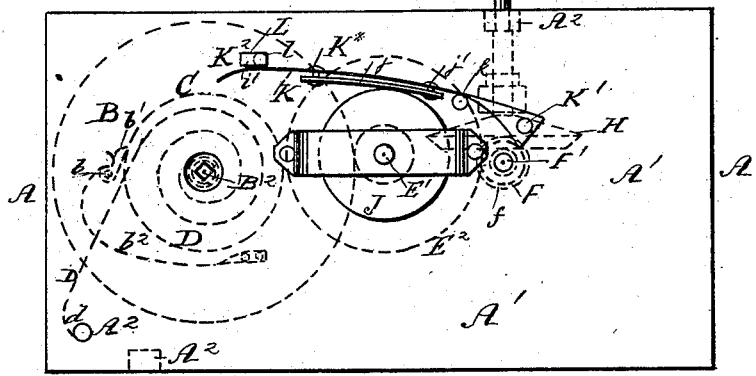
WITNESSES:　　　　　　　　　　　INVENTOR
W. Colborne Brookes　　　　　　Thomas D. Faulkner
　　　　　　　　　　　　　　　BY C. J. Richardson
　　　　　　　　　　　　　　　　　ATTORNEYS.

(No Model.) 2 Sheets—Sheet 2.
T. D. FAULKNER.
SPRING MOTOR.
No. 273,047. Patented Feb. 27, 1883.
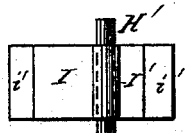
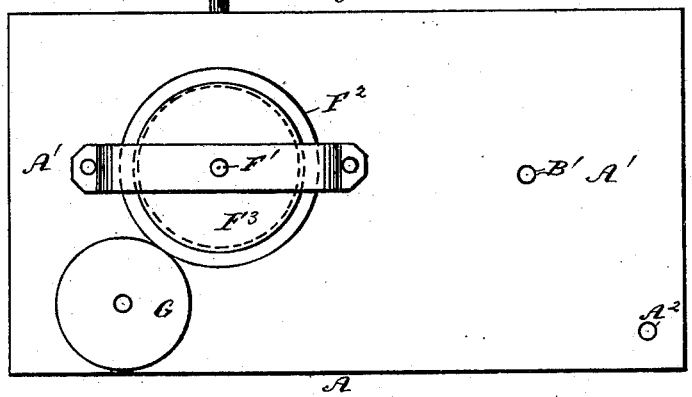
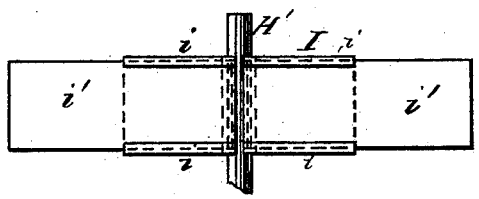
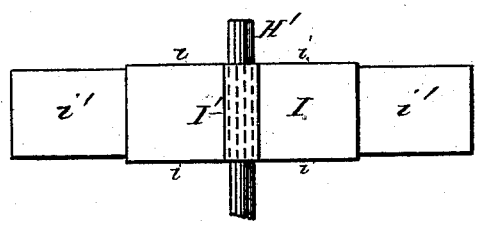
WITNESSES:
W. Colborne Brookes
[signature]
INVENTOR
Thomas D. Faulkner
BY [signature]
ATTORNEYS.

UNITED STATES PATENT OFFICE.

THOMAS D. FAULKNER, OF FORT MILL, SOUTH CAROLINA.

SPRING-MOTOR.

SPECIFICATION forming part of Letters Patent No. 273,047, dated February 27, 1883.

Application filed September 30, 1882. (No model.)

*To all whom it may concern:*

Be it known that I, THOMAS DICKSON FAULKNER, a citizen of the United States, residing at Fort Mill, in the county of York and State of South Carolina, have invented certain new and useful Improvements in Spring-Motors, of which the following is a specification.

My invention relates to improvements in spring-motors, the nature of which will be fully explained by reference to the accompanying specification and the drawings annexed, which form part of the same.

Referring to the drawings, Figure 1 is a plan view, and Figs. 2 and 3 opposite side views, of apparatus constructed according to my invention. Figs. 4, 5, 6, and 7 are detail views of parts.

In each of the views similar letters of reference are employed to indicate corresponding parts wherever they occur.

A A represent the main framing, which is composed of two principal portions, A' A', connected together by cross-braces $A^2$.

Between the parts A' A' of the framing A, I mount a gear-wheel, B, upon the face of which is formed or affixed a pivot, $b$, upon which turns a pawl, $b'$, which is borne against by a spring, $b^2$, mounted on the face of the wheel B. The wheel B revolves and is arranged to turn freely on its axle B' in one direction, while in the opposite direction it is driven by the pawl $b'$, engaging with the teeth of a ratchet-wheel, C, formed on or affixed to the axle B'.

To the axle B' is attached one end of a coiled spring, D, the other end of which is attached at $d$ to one of the cross-braces $A^2$. The spring is wound up by means of a suitable crank or key applied, when desired, to the square (or other suitably formed) end $B^2$ of the axle B'.

Motion is communicated by means of the wheel B to a small pinion, E, mounted on one end of a shaft, E', (revolving in bearings in the framing A,) on the opposite end of which is mounted a gear-wheel, $E^2$, the teeth of which engage with the teeth of a pinion, F, formed on or affixed to one end of a shaft, F', working in bearings, also carried by the main framing A. The shaft F' extends through the framing A, where it is provided with a gear-wheel, $F^2$, which gears into a second wheel, G, which may be provided with a shaft, or otherwise, for the purpose of communicating motion to any description of light machines.

Upon the exterior of the gear-wheel $F^2$ is formed or affixed a pulley or driving-wheel, $F^3$, adapted to receive a belt, cord, or gut, by means of which motion may be communicated to a sewing-machine or other light-running device.

Upon the shaft F' is mounted a bevel-pinion, $f$, which gears into the teeth of a disk or wheel, H, formed on or affixed to the lower end of a vertical shaft, H', working in bearings carried by the cross-braces $A^2$.

At the upper end of the shaft H' is applied a plate, I, formed with a hub or bearing, I', adapted to fit the upper end of the shaft H'. The plate I is formed with grooved flanges $i\ i$, in which are received sliding blades or vanes $i'\ i'$, which are capable of being drawn out from or pushed in toward or beyond the center, so as to present a greater or less surface of resistance to the air when being revolved, thereby forming an adjustable automatic regulator. When the machine is desired to run fast, the vanes will be pushed in; but when it is desired to reduce the velocity of revolution of the parts of the apparatus, the vanes will be drawn out accordingly, so as to present a great surface of resistance to the air.

As an additional means of regulating the speed of the apparatus, I apply upon the shaft E', (which is carried through the framing A for that purpose,) a friction-wheel, J, above which is arranged a friction-pad, $j$, supported at one end by a stud or projection, $j'$, carried by the main framing A, while at its opposite end it is operated by a stud or projection, $k$, formed on or affixed to the under side of a regulating-spring, K, screwed on or otherwise attached at K' to the framing A, and carried over the stud or support $k$. At its forward end, $K^2$, the spring K is slightly bent down, and is adapted to be depressed by means of a cam-piece, L, turning on a center, $l$, carried by the main framing A, and operated by means of a thumb-piece or projection, $l'$.

When it is desired to put a greater retarding action on the device than the regulator is capable of exerting, all that is necessary is to turn the thumb-piece $l'$, so as to cause the cam-piece L to depress the spring K*, and force the friction-pad $j$ down upon the friction-wheel J, thereby retarding the same, and consequently the motion of the various parts of the device and the machinery operated thereby. An equal acceleration of motion will be effected by removing the pressure or friction from the wheel J.

My improved device may be formed with feet and clamps or other suitable devices for supporting the same securely in position beneath, at the side of, or any other suitable position for driving a sewing or other light machine or device.

Having thus described my invention, what I claim, and desire to secure by Letters Patent, is—

1. The combination, with the main spring and gearing of a motor, of the friction-wheel J, friction-pad $j$, spring K, cam-piece L, and thumb-piece $l$, substantially as and for the purpose set forth.

2. The combination, with the main spring and gearing of a motor, of a revolving regulator, consisting of a shaft, H', plate I, flanges $i\ i$, sliding vanes or blades $i'\ i'$, and a friction-wheel, J, friction-pad $j$, spring K, cam-piece L, and thumb-piece $l$, substantially as shown and described.

In witness whereof I have hereunto set my hand this 13th day of September, 1882.

THOMAS DICKSON FAULKNER.

Witnesses:
J. M. CHERRY,
R. T. FEWELL.